(12) United States Patent
Goto et al.

(10) Patent No.: US 6,274,248 B1
(45) Date of Patent: Aug. 14, 2001

(54) THERMOPLASTIC COMPOSITE COMPOSITION REINFORCED WITH MICA AND WOODEN FIBER FILLER

(75) Inventors: Fumio Goto; Yasumasa Kasahara, both of Okayama (JP)

(73) Assignee: Namba Press Works Co., Ltd., Kurashiki (JP)

( * ) Notice: Subject to any disclaimer, the term of this patent is extended or adjusted under 35 U.S.C. 154(b) by 0 days.

(21) Appl. No.: 09/355,141
(22) PCT Filed: Jan. 16, 1998
(86) PCT No.: PCT/JP98/00139
  § 371 Date: Jul. 22, 1999
  § 102(e) Date: Jul. 22, 1999
(87) PCT Pub. No.: WO99/29781
  PCT Pub. Date: Jun. 17, 1999

(30) Foreign Application Priority Data

Dec. 9, 1997 (JP) ...................................................... 9-354071

(51) Int. Cl.$^7$ ............................... B32B 27/00; C08K 3/34
(52) U.S. Cl. ...................... 428/500; 428/511; 428/537.1; 428/688; 524/13; 524/449; 524/543
(58) Field of Search .................................... 428/500, 511, 428/537.1, 688; 524/13, 449, 543

(56) References Cited

U.S. PATENT DOCUMENTS 5,206,087  4/1993  Tokiwa et al. ...................... 428/403

FOREIGN PATENT DOCUMENTS

| | | |
|---|---|---|
| P-002115578 | 12/1981 | (JP) . |
| 58092161 | 5/1983 | (JP) . |
| 59050273 | 3/1984 | (JP) . |
| P-002115577 | 10/1984 | (JP) . |
| 01325163 | 12/1989 | (JP) . |

OTHER PUBLICATIONS

Supplementary European Search Report dated Sep. 16, 1999, citing references AA–FF identified above in conjunction with European Patent Application No. EP98900389, which is a foreign counterpart to the subject U.S. patent application.

Primary Examiner—Samuel A. Acquah
(74) Attorney, Agent, or Firm—Renner, Kenner, Greive, Bobak, Taylor & Weber

(57) ABSTRACT

A thermoplastic resinous composite material has the good flowability of a meltage of the composite material during a molding process and can provide not only the excellent tensile strength, the excellent flexural strength, the excellent flexural elasticity and the excellent H.D.T of a product molded using the composite material but also provide the better impact resistance which can not be achieved by a composite material of the art. The thermoplastic resinous composite material is made from a mixture mainly consisting of mica, a wood cellulose filler and a thermoplastic resin. The mix proportion of mica, the wood cellulose filler and the thermoplastic resin is 10–50 weight by parts 10–43 weight by parts: 70–82 weight by parts.

16 Claims, 2 Drawing Sheets

(a)

(b)

THERMOPLASTIC COMPOSITE COMPOSITION REINFORCED WITH MICA AND WOODEN FIBER FILLER

TECHNICAL FIELD

The present invention relates to a thermoplastic resinous composite material used for a variety of molding processes, and, in particular, relates to a thermoplastic resinous composite material made from a mixture consisting of a certain size of a flat inorganic material, a wood cellulose filler, and a thermoplastic resin in a predetermined mix proportion, so as to provide the good flowability of a meltage of the composite material during a variety of molding processes and provide not only the excellent tensile strength, the excellent flexural strength, the excellent flexural elasticity and the excellent heat deformation temperature (hereinafter written as H.D.T) but also the good impact resistance of a product molded using the composite material.

BACKGROUND OF ART

A thermoplastic resinous composite material is molded into panel boards and parts by a molding technique such as an extrusion molding and an injection molding. Talc or calcium carbonate may be used as an additive material to be contained in the composite material in order to improve the physical property of a product molded using the composite material. Mica is also widely used as such an additive material.

In general, the shape of mica is flat, and it is known that mica is well dispersed in a meltage of the composite material during a molding process and is orientated along a surface of a product molded using the composite material (see FIG. 2) and is also known that the product made from the composite material containing mica is excellent in the tensile strength, the flexural strength, the flexural elasticity and the H.D.T. Thus, less than 800 μm in weight average flake size and 30–50 in weight average aspect ratio of mica is contained in the thermoplastic resinous composite material.

Also, it is well known that a composite material made from a mixture of polypropylene and a wood cellulose filler, such as a wood powder and a paper, is used for an extrusion molding.

The wood cellulose filler mixed is obtained by grinding a wood material in about 40–200 mesh. This wood cellulose filler contains large a large quantity of cylindrical fragments and a small quantity of granulous fragments, as shown in FIG. 1 (FIG. 1 is a rough sketch of a wood powder magnified by a microscope).

In a molding process which uses a composite material made from a mixture of such a wood cellulose filler and an olefin series plastic, the wood cellulose filler is strongly orientated in a flow direction (i.e. a meltage of the composite material is flowing in the flow direction and is simultaneously molded) so as to cause differences in magnitude of the tensile strength, the flexural strength, the flexural elasticity and the impact resistance between the flow direction and a direction perpendicular to the flow direction, so that a product molded using such a composite material is warped and distorted.

In addition, the tensile strength and the flexural elasticity of the product are excellent in the flow direction, because the wood cellulose filler is strongly orientated in the flow direction. However, if the amount of the wood cellulose filler added is increased, the fragility of the product is increased i.e. the impact resistance thereof is considerably reduced.

In addition, the shape of each fragment of the ground wood cellulose filler is uneven and the surface thereof has irregularities so as to easily hitch. However, if the wood cellulose filler is mixed together with the olefin series plastic having a smooth surface, fragments of the wood cellulose filler and particles of the olefin series plastic are separated from each other by vibrations caused when the mixture is falling down from a hopper (located at a section for supplying the composite material to a molding machine) to a screw section, so that the mix proportion is changed.

In addition, while the wood cellulose filler is melted and mixed together with the olefin series plastic in the screw section, the wood cellulose filler is not well dispersed in a meltage of the composite material in comparison with inorganic fillers. Thus, if a composite material containing such a wood cellulose filler is used, the physical property to be exhibited in each product molded may be different and is often largely differed.

As discussed above, the additive material and the filler are very effective materials for improving the physical property of the product such as the tensile strength, the flexural strength, the flexural elasticity and the H.D.T. However, the good impact resistance of the product can not be achieved in simultaneous with those physical properties.

Several methods have been provided for achieving the good impact resistance in simultaneous with achieving the good tensile strength, the good flexural elasticity and the good H.D.T.

For example, there is a method which improves the impact resistance by undergoing a rubber-modification process to modify the olefin series plastic into ethylene-modified-polypropylene in a composite material made from a mixture consisting of the olefin series plastic and an inorganic material such as talc, calcium carbonate and the like. However, in this method, the flowability of a meltage of the composite material during a molding process is reduced and the cost is essentially high so that this method is not practical.

In European Patent No. 0319589 (corresponding to Japanese Patent Publication No. Showa 60(1985)-40965 entitled "Method and Apparatus for producing Panel"), in a composite material made from a mixture mainly consisting of a wood cellulose filler such as a wood powder and an olefin series plastic, fiber flax is used in combination therewith. In this method, the impact resistance to be achieved in a product molded using the composite material is excellent. However, the flexural elasticity of the product and the flowability of a meltage of the composite material during a molding process are considerably reduced.

In addition, in Japanese Patent Publication No. Showa 57(1982)-43575entitled "Composite Material using Paper and Method for producing same", in a composite material made from a mixture mainly consisting of a wood cellulose filler such as a paper and an olefin series plastic, a natural or synthetic rubber is used in combination therewith. In this method, the impact resistance is improved by elastomer. However, the cost is high, the flowability of a meltage of the composite material during a molding process is considerably low, and the productivity is low.

As discussed above, in a composite material made from a mixture of an olefin series plastic and an inorganic filler such as talc or an organic filler such as a wood cellulose, the physical property exhibited in a product molded using the composite material is excellent in the tensile strength, the flexural strength, the flexural elasticity and the H.D.T, and such excellent properties can be easily provided for the product by controlling the amount and the size of the filler to be added. However, the impact resistance of the product is reduced. In other words, as improving the impact resistance, not only the physical property such as flexural elasticity and the like but also the flowability of a meltage of the composite material during a molding process are considerably reduced.

This is because the physical property such as the tensile strength, the flexural elasticity and the H.D.T is, in general, contrary to the impact resistance of the product and the flowability of the composite material during a molding process.

Thus, it has been believed that it is difficult to provide a thermoplastic resinous composite material which has the good flowability of a meltage of the composite material during the molding process and which can provide the good flexural strength, the good flexural elasticity, and the good H.D.T for a product molded using the composite material and can also achieve the good impact resistance.

The present invention is made in view of those matters discussed above. An object of the present invention is to provide a thermoplastic resinous composite material which has the good flowability of a meltage of the composite material during the molding process and which can provide the good flexural strength, the good flexural elasticity, and the good H.D.T for a product molded using the composite material and can also achieve the good impact resistance which can not be achieved by a composite material of the art.

Another object of the present invention is to provide the above composite material suitable for use in an extrusion molding, a compression molding, a transfer molding and a blow molding.

Still another object of the present invention is to provide the above composite material usable for an injection molding.

DISCLOSURE OF THE INVENTION

A thermoplastic resinous composite material of the present invention is made from a mixture mainly consisting of mica, a wood cellulose filler and a granulous thermoplastic resin which are evenly dispersed therein.

The mix proportion of mica, the wood cellulose filler and the thermoplastic resin is 10–50 weight by parts: 10–43 weight by parts: 70–82 weight by parts.

If the thermoplastic resinous composite material is used in an extrusion molding or a blow molding, it is desirable that the mix proportion of mica, the wood cellulose filler and the thermoplastic resin is 10–35 weight by parts: 10–30 weight by parts: 50 weight by parts. If the thermoplastic resinous composite material is used in an injection molding, it is desirable that the mix proportion of mica, the wood cellulose filler and the thermoplastic resin is 15–35 weight by parts 10–25 weight by parts: 65 weight by parts.

The kind and the shape of the wood cellulose filler are not strictly limited and are determined depending on a purpose of use. The wood cellulose filler is preferably selected from wood powders obtained by grinding a wood material such as a needle-leaf tree, a broad-leaf tree, a hard board and the like. The wood powder is various in shape and may be ground in granulous, laminar or the other shapes. The size of the wood powder is not strictly limited, but if the size is too large, the wood powder will come up to a surface of a product molded, so that such a large size of the wood powder affects the visual quality of the product and causes an internal stress in the product so as to reduce the physical property thereof. If the size of the wood powder is too small, the dispersibility will be reduced so as to make worse the flowability of a meltage of the composite material during a molding process and to make worse the physical property (in particular, the impact resistance). Thus, it is desirable that the size of the wood powder is 50–700 μm. When the composite material is used in an extrusion molding or a blow molding, it is desirable that the size of the wood powder is 70–600 μm and the water content thereof is 2%. When the composite material is used in an injection molding, it is desirable that the size of the wood powder is 70–300 μm and the water content is 2%.

Mica used herein is an important component of the composite material of the present invention, and the weight average flake size and the weight average aspect ratio thereof is a basis for achieving the effect of the present invention.

Some of composite materials of the art are made from a mixture of mica and an olefin series plastic. In a product molded using the composite material of the art, micaceous flakes are strongly orientated on a surface portion of the product (see FIG. 2) so as to provide the good physical property in a flow direction of a meltage of the composite material during a molding process and in a direction perpendicular to the flow direction (in two directions). Thus, the inventors of the present invention have studied whether the reduction of the impact resistance caused by the wood cellulose filler can be restrained or not. However, even though mica having the same size as mica used in the composite material of the art composed of mica and an olefin series plastic is merely contained in a composite material composed of a wood cellulose filler and an olefin series plastic, the impact resistance can not be improved, rather is reduced by increasing the amount of such an additive material to be contained in the composite material.

Thus, the inventors of the present invention have conducted a variety of tests and researches and have then found that it is necessary to match the size of mica to the size of the wood cellulose filler (i.e. the size of mica used in the present invention is larger than that of the art) so that the orientation of mica becomes the same as or slightly larger than the orientation of the wood cellulose filler.

The weight average flake size of mica is preferably 100–300 μm, more preferably 200–280 μm. The aspect ratio of mica is preferably 50–75, more preferably 60–70.

The good impact resistance can be provided for a product molded using a composite material made from a mixture containing such mica. In addition, such a size of mica can accelerate the dispersibility of the wood cellulose filler and matches to the size of the cylindrical wood cellulose filler, and mica is evenly mixed with the filler so as to serve as a lubricant, so that the flowability of a meltage of the composite material containing the wood cellulose filler and a thermoplastic resin is improved. Thus, the thermoplastic resinous composite material of the present invention is usable not only for an extrusion molding and a compression molding but also for an injection molding and a blow molding.

In addition, when dry mixing and stirring such mica with the wood cellulose filler and the thermoplastic resin and dropping this mixture from a hopper (for introducing to a molding machine) to a screw section and when melting and kneading it in the screw section, the mix proportion of mica, the wood cellulose filler and the thermoplastic resin does not change, so that those components are evenly mixed together in most efficient.

It is desirable that the thermoplastic resin used in the present invention is an olefin series plastic desirably selected from the group consisting of polyethylene, polypropylene, and a modified or induced compound thereof.

The mix proportion of mica, the wood cellulose filler and the thermoplastic resin is as discussed above. Such a mix proportion has been determined on the basis of a variety of conditions discussed above so that the good flowability of a meltage of the composite material during a molding process and the good impact resistance which can not be achieved by a composite material of the art can be achieved in simultaneous with the good tensile strength, the good flexural strength, the good flexural elasticity and the good H.D.T of a product molded using the composite material.

The physical property as described above can be achieved. This is because a predetermined size of mica, the wood cellulose filler and the thermoplastic resin are mixed together. Also, there may be the following reason as the other reasons why such a physical property can be achieved. That is, even though the wood cellulose filler to be contained in the composite material is dried at high temperature, when the wood cellulose filler is heated with the other components of the composite material at 190–230° C., the residual free water is oozed out on a surface thereof and it exhibits acid. Such oozed out free water inhibits the adhesion to the thermoplastic resin (i.e. the olefin series plastic), but when mica and the free water at this temperature are contacted each other, it exhibits alkaline so as to neutralize said acid, so that the inhibitor on the contact surface between the wood cellulose filler and the olefin series plastic is inactivated so as to promote the adhesion therebetween. As a result, the good and balanced physical property can be provided by a combination of mica and the wood cellulose filler.

BRIEF DESCRIPTION OF DRAWINGS

FIG. 2a is a perspective view of a product molded using a composite material of the present invention by an injection molding and the product is shown with a flow direction of a meltage of the composite material during the molding process, and FIG. 2b shows cross sectional views of (A) and (B) of FIG. 2a.

BEST MODE FOR CARRYING OUT THE INVENTION

Using a thermoplastic resinous composite material according to the present invention, two products are molded. One is produced by an extrusion molding, and the other is produced by an injection molding. Table 1 shows the physical property of each product.

The mix proportion of components of the composite material used for the product molded by the extrusion molding is 50 weight by parts (polypropylene): 15–35 weight by parts (mica): 10–30 weight by parts (a wood powder). The mix proportion of components of a composite material used for the product molded by the injection molding is 65 weight by parts (polypropylene): 10–35 weight by parts (mica): 5 10–20 weight by parts (a wood powder).

TABLE 1

|  | Product (by Extrusion) | Product (by Injection) |
| --- | --- | --- |
| Flowability (MFR) | 3.0–5.5 | 9.5–7 |
| Density (g/cc) | 1.07–1.14 | 1.07–1.13 |
| Tensile Strength (kg/cm$^2$) | 320–380 | 320–345 |
| Flexural Elasticity (kg/cm$^2$) | 32000–45000 | 22000–35000 |
| Impact Resistance (IZOD notch) (kg cm/cm) | 2.5–3.4 | 3.1–3.7 |
| H.D.T. (186 kg/cm$^3$ ° C.) | 97–112 | 97–107 |

Figure 1:
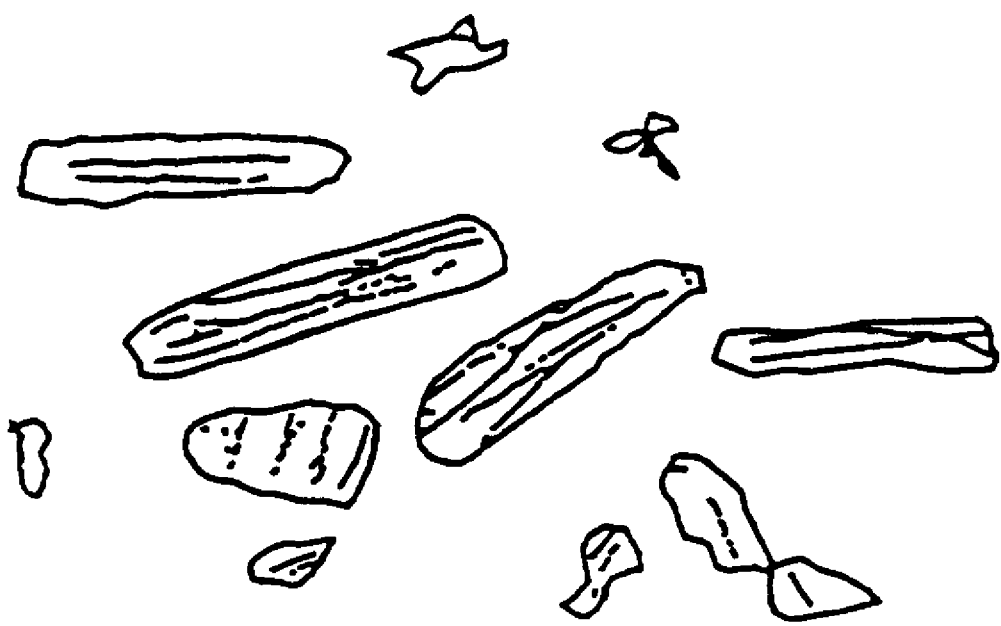
FIG. 1 is a magnified rough sketch of a wood cellulose filler (a wood powder) mixed in a composite material.
Figure 2:
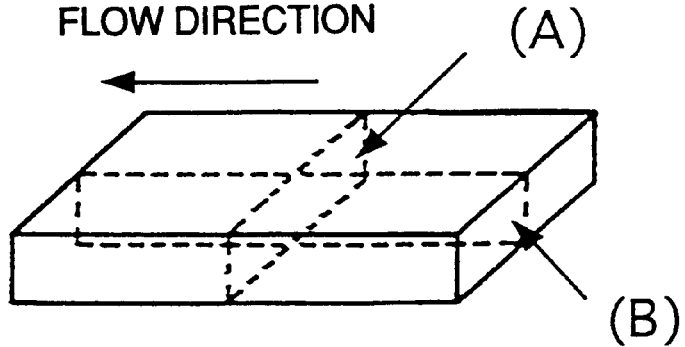
Figure 2:
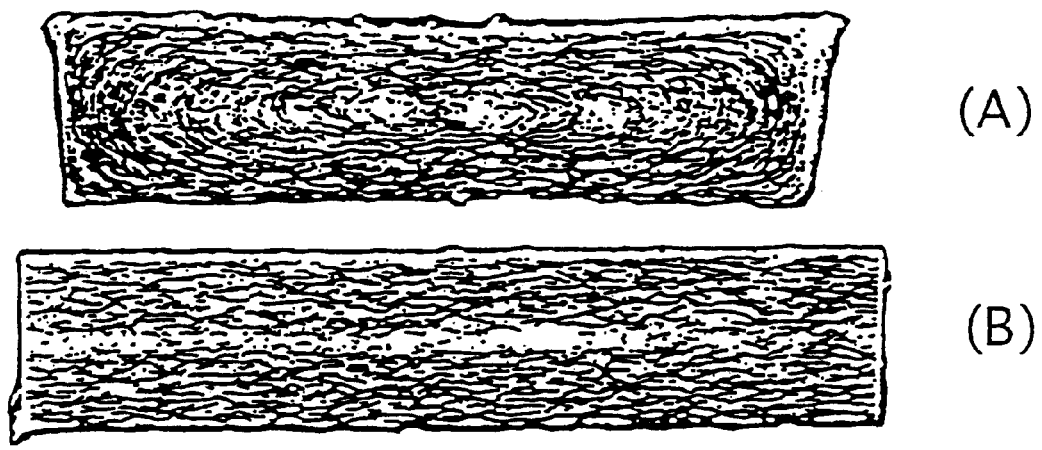

FIG. 2a is a perspective view of a product molded using the composite material. The product is shown with a flow direction of a meltage of the composite material during the molding process. FIG. 2b shows cross sectional views which show the aspects of orientations in the flow direction and a direction perpendicular to the flow direction, respectively. Those cross sectional views are depicted on the basis of photographs of those cross sections. As shown, micaceous flakes and the wood cellulose filler are strongly orientated in two directions on a surface of the product.

As described above, a thermoplastic resinous composite material according to the present invention, which contains a wood cellulose filler and mica whose size matches to the size of the wood cellulose filler in a predetermined mix proportion, advantageously provides a good impact resistance and a good flowability of a meltage of the composite material during a variety of molding processes which can not be achieved by the art in simultaneous with an excellent tensile strength, an excellent flexural strength, an excellent flexural elasticity and an excellent H.D.T, for a product molded using the composite material.

In a composite material of the art, the flowability of a meltage of the composite material during a molding process is not sufficient for providing a good impact resistance for a product molded using the composite material, and thus, the composite material of the art composed of an olefin series plastic and a wood cellulose filler such as wood powder and a paper can not be used for an injection molding. Such a problem of the art is advantageously overcome by the composite material of the present invention, and the composite material of the present invention is usable not only for an extrusion molding and a blow molding but also for an injection molding under common conditions, and as a result, the application of the composite material is expanded.

In general, as a problem of a composite material containing a wood cellulose filler, each product molded using the composite material may have a variety of strength and may be warped and distorted. The composite material of the present invention considerably restrain such a variety of strength, warping and distortion.

It is not necessary to provide a special grade of microscopically ground mica as mica added in the composite material of the present invention, and thus, the composite material can be provided in a relatively low cost.

What is claimed is:

1. A thermoplastic resinous composite material made from a mixture mainly consisting of mica, a wood cellulose filler, and a granulous thermoplastic resin, characterized in that:

10–50 weight by parts of mica,

10–43 weight by parts of the wood cellulose filler, and

70–82 weight by parts of the thermoplastic resin, are evenly dispersed therein, and the weight average flake size of said mica is 100–300 μm, the aspect ratio of said mica is 60–70, and said wood cellulose filler is a powder that has a size of 70–300 μm, and a water content of less than 2%.

2. The thermoplastic resinous composite material of claim 1, wherein

10–35 weight by parts of mica,

10–30 weight by parts of the wood cellulose filler, and 50 weight by parts of the thermoplastic resin, are evenly dispersed therein, when said thermoplastic resinous composite material is used for an extrusion molding or a blow molding.

3. The thermoplastic resinous composite material of claim 1, wherein

10–35 weight by parts of mica,

10–25 weight by parts of the wood cellulose filler, and 60 weight by parts of the thermoplastic resin, are evenly dispersed therein, when said thermoplastic resinous composite material is used for an injection molding.

4. The thermoplastic resinous composite material of claim 1, wherein the weight average flake size of said mica is 100–280 μm, and the aspect ratio thereof is 60–70.

5. The thermoplastic resinous composite material of claim 1, wherein said thermoplastic resin is an olefin series plastic.

6. The thermoplastic resinous composite material of claim 4, wherein the weight average flake size of said mica is 100–280 μm, and the aspect ratio thereof is 60–70.

7. A thermoplastic resinous composite comprising:

10–50 parts by weight mica, where said mica has a weight average flake size of 100–300 μm;

10–43 parts by weight wood cellulose filler, where said wood cellulose filler has a size that is 70–300 μm; and 70–82 parts by weight thermoplastic resin.

8. The thennoplastic resinous composite material of claim 7, where the composite comprises 10–35 parts by weight of said mica, 10–30 parts by weight of said wood cellulose filler, and 50 parts by weight of said thermoplastic resin.

9. The thermoplastic resinous composite material of claim 7, where said composite comprises 15–35 parts by weight of said mica, 10–25 parts by weight of said wood cellulose filler, and 65 parts by weight of said thermoplastic resin.

10. The thermoplastic resinous composite material of claim 7, where said wood cellulose filler has a water content of less than 2%.

11. The thermoplastic resinous composite material of claim 7, where the weight average flake size of said mica is 100–280 μm.

12. The thermoplastic resinous composite material of claim 11, where the weight average flake size of said mica is 200–280 μm.

13. The thermoplastic resinous composite material of claim 7, where the aspect ratio of said mica is 50–75.

14. The thermoplastic resinous composite material of claim 13, where the aspect ration of said mica is 60–70.

15. The thermoplastic resinous composite material of claim 7, where said thermoplastic resin is polyethylene, polypropylene, or a modified or induced compound thereof.

16. A thermoplastic resinous composite comprising:

10–50 parts by weight mica, where said mica has a weight average flake size of 100–300 μm and an aspect ration of 50–70

10–43 parts by weight wood cellulose filler, where said wood cellulose filler has a size that is 70–300 μm and a water content that is less than 2%; and 70–82 parts by weight of polyethylene, polypropylene, or a modified or induced compound thereof.

* * * * *